Feb. 4, 1936.                    G. T. BALFE                    2,029,302
GASKET AND GASKET MATERIAL
Original Filed Jan. 13, 1930
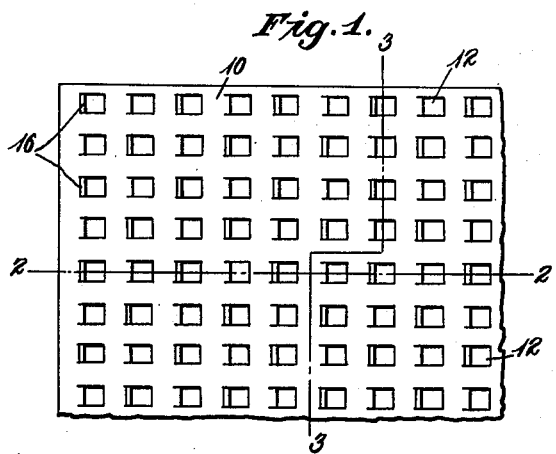
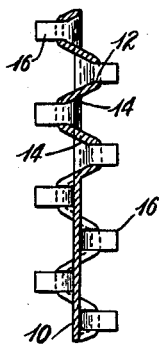
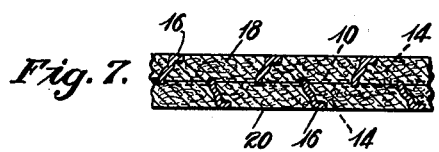
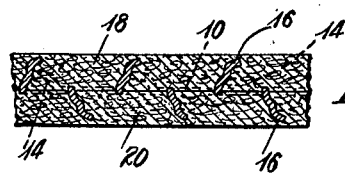
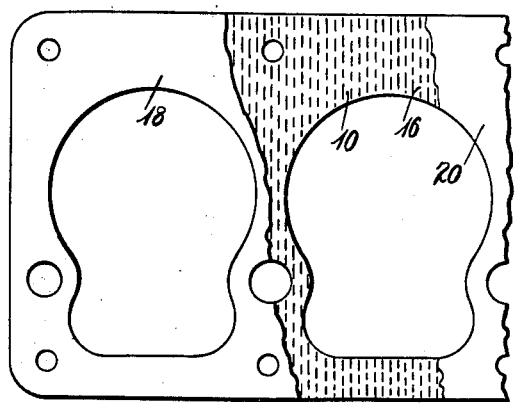
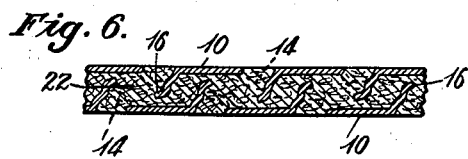
Inventor
George T. Balfe
By Cushman Bryant & Darby
Attorneys Patented Feb. 4, 1936

2,029,302

UNITED STATES PATENT OFFICE 2,029,302

GASKET AND GASKET MATERIAL

George T. Balfe, Detroit, Mich., assignor to Detroit Gasket & Mfg. Co., Detroit, Mich., a corporation of Michigan Original application January 13, 1930, Serial No. 420,331, now Patent No. 1,776,140, dated September 16, 1930. Divided and this application September 15, 1930, Serial No. 482,098

3 Claims. (Cl. 288—1)

This invention relates to an improved laminated material consisting of a core of cushion structure faced with perforate metal layers having projections embedded in the core and particularly useful for gaskets.

My invention specifically relates to gaskets and has particular reference to a type of gasket primarily designed for use where high pressures must be withstood and a tight seal maintained.

An object of my invention is to greatly increase the efficiency, lengthen the use and the life, and in general improve a gasket structure somewhat similar to that described and claimed in my copending application Serial Number 420,331, filed January 13, 1930, which has issued into United States Patent 1,776,140, September 16, 1930.

More specifically the object of my invention is to so construct and shape a reinforcing element or material which is embedded in any suitable gasket material that it will form a more binding union between the two and will form a barrier tending to resist breakage or blowouts through the gasket material. As is well known, there is a tendency for gaskets, particularly when they are subjected to high temperatures and pressures at the same time, to burn, break, or tear at some points. Such burning or tearing heretofore has marked the end of the useful functions of the gasket because the union, or cohesion of the gasket as a unit has been insufficient to prevent the spreading of this tear.

Through the use of a reinforcing plate having protruding tongue portions minutely spaced apart on each side thereof, which are embedded in suitable compressible gasket material, a large series of barriers is erected to withstand any tendency of an initial burn or tear to spread further through the gasket. Also, by greatly increasing the cohesion between my reinforcing element and the gasket material I have assisted in minimizing the tendency to break and preventing the spreading thereof should it occur.

This tendency of an initial break or tear to spread through the gasket applies particularly to gaskets used in combustion engines, where the various points which are subject to heat and pressure are located in close proximity to one another.

In a gasket, it is highly desirable that the heat at the edge around the combustion chamber and at the interior of the gasket be quickly conducted away to the cooling surfaces of the cylinder head and block. In this gasket, the metal surfaces not only have sufficient flexibility due to their perforations but also conduct the heat in this manner. The tangs upon the metal outer layers and which project to the interior of the gasket conduct heat from the interior to the outer layers which are in contact with the water-cooled block and head.

Still other objects and meritorious features of my invention will become apparent from the following description taken in conjunction with the drawing wherein like numerals refer to like parts throughout the several figures and wherein:

Fig. 1 is a plan view of my reinforcing element,

Fig. 2 is a section taken on the line 2—2 of Fig. 1,

Fig. 3 is a section taken on the line 3—3 of Fig. 1,

Fig. 4 is a section through my coupled gasket, illustrating the manner in which my reinforcing element is embedded between layers and gasket material, Fig. 5 is a plan view, partly broken away, of a gasket used in the cylinder head of a combustion engine, Fig. 6 is a somewhat modified arrangement of my gasket structure.

Fig. 7 illustrates another modified assembly, and

Fig. 8 is a sectional view of an insert or reinforcement having the protuberances formed from one side only.

My reinforcing element comprises a thin sheet of reinforcing material 10, preferably of sheet steel. My reinforcing sheet is provided with horizontal and vertical rows of apertures or perforations 12. These apertures may be spaced equally from each other both horizontally and vertically, and are formed with a punch machine which need not be described herein, but fashions the punch apertures in a manner hereafter to be described.

These apertures or perforations are closely compacted and punches enter the sheet 10 from opposite directions to form alternating apertures extending in opposite directions. The result of this alternate punching is clearly illustrated in Figs. 2 and 3 where alternate apertures are shown extending in opposite directions. In the direction in which the punch enters a crater like depression 14 or cup is formed. This cup forms an oppositely directed protuberance. This protuberance includes a small tongue 16 extending away laterally from the plane of the reinforcing element 10. The spacing between each of the apertures or cup like depressions or protuberances in my element 10 is somewhat exaggerated in the drawing for the purpose of more clearly illustrating the precise structure resulting from the punch but they are closely compacted and preferably arranged in staggered rows. The portion marked 14, constituting the crater like protuberance or cup shaped depression is minute, but necessarily results in the initial contact of my punch with the sheet material of the reinforcing element. The tang 16 is also relatively small but projects beyond the protuberance 14.

This reinforcing element is shown in Figs. 4 and 5 as embedded between two layers 18 and 20 of suitable gasket material, which may be felt, asbestos, or any desired packing substance. This embedding operation is accomplished by compressing the two layers 18 and 20 toward one another after having inserted the reinforcing element 10 therebetween.

The tongue 16 is of a deformable nature, and when subjected to pressure will deform in the manner indicated in Fig. 4 to constitute a clamp or hook. In this way the protuberances 14, as well as the deformed tongue extensions 16 will function to form a more cohesive binding, gasket unit than has hitherto been available.

A feature of importance is that the packing material is forced into the crater like apertures, one layer on one side of the perforated metal sheet and the other layer on the other side thereof and thereby forms a much more perfect joint.

The protuberances which form the craters or apertures are staggered and together with the tongues form barriers in the packing layers which obstruct the blowing through of the packing material.

The uniform thickness of my gasket structure eliminates the necessity of excess pressure around the openings thereof, which the double thickness around the edges of the customary copper gasket requires for the purpose of sealing the joint properly.

While the tongue portions here shown do not extend entirely through the packing layers, they might readily do so and be clinched down to embed therein, as indicated in Fig. 7. Such structure only necessitates utilizing somewhat narrower layers of packing material or increasing the length of tongues 16.

Furthermore, it is obvious that if a very stiff reinforcing sheet material is used, there need be no deformation, or clinching over of the upper portions of tongue 16 when the layers of gasket material are compressed thereon. The tongues 16 will then retain the position illustrated in Fig. 2 when embedded.

In Fig. 6 I have illustrated a possible modification of my gasket assembly, wherein a single layer 22 of packing material only is utilized and the projections of the reinforcing element 10 embedded therein on opposite sides thereof, to extend more than half-way through the packing material, as shown. In this construction, the perforate metal layers and interposed fibrous cushion material layer are coextensive. The perforate metal layers, as shown in Figure 8, are provided with a multiplicity of inwardly punched projections struck up from the metal to form the apertures or perforations 12. The projections are closely spaced and extend throughout the area of the metal sheets from which they are punched. The metal sheets are disposed with relation to the packing layer with the projections directed inwardly and are embedded in the fibrous cushion layer. In this manner, (1) barriers extending more than half-way through the packing material are formed, and (2) relative lateral movement of the cushion packing material and metal layers is prevented, and a thoroughly tight and rigid structure, having the required flexibility and resilient quality, is obtained.

Due to the fact that the outer surfaces of my gasket are composed of packing material and compressible, it may be utilized to seal joints between somewhat roughened or uneven elements. Accordingly I contemplate its use between surfaces which are uneven, warped, or which have not been machined.

While I have illustrated a preferred embodiment of my invention, various other modifications will be apparent to those skilled in the art and for that reason I intend to limit myself only within the scope of the appended claims.

This application is a division of my copending application, Serial No. 420,331, filed January 13, 1930.

I claim:

1. A gasket comprising coextensive layers of perforate metal and interposed therebetween fibrous cushion material, the metal layers being provided with a multiplicity of closely compacted inwardly punched projections adjacent the perforations in said sheets and embedded in the cushion material, thus preventing relative lateral movement of the cushion material and/or the metal layers.

2. Material for gaskets comprising coextensive layers of perforate metal and interposed therebetween fibrous cushion material, the metal layers being provided with a multiplicity of closely compacted inwardly punched, closely spaced projections adjacent the perforations in said sheets throughout the area thereof and embedded in the cushion material, thus preventing relative lateral movement of the cushion material and/or the metal layers.

3. A gasket comprising coextensive layers of perforate metal and interposed therebetween a packing material, the metal layers being provided with a multiplicity of closely compacted inwardly punched projections adjacent the perforations in said layers and embedded in the packing material, said projections extending more than half-way through said packing material, thus forming a multiplicity of closely spaced barriers and preventing relative lateral movement of the packing material and/or the metal layers.

GEORGE T. BALFE.